US007698317B2

(12) United States Patent
Sasturkar et al.

(10) Patent No.: US 7,698,317 B2
(45) Date of Patent: Apr. 13, 2010

(54) TECHNIQUES FOR DETECTING DUPLICATE WEB PAGES

(75) Inventors: Amit Sasturkar, Santa Clara, CA (US); Rajat Ahuja, San Jose, CA (US); Shanmugasundaram Ravikumar, Berkeley, CA (US); Vladimir Ofitserov, Foster City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 353 days.

(21) Appl. No.: 11/788,505

(22) Filed: Apr. 20, 2007

(65) Prior Publication Data

US 2008/0263026 A1   Oct. 23, 2008

(51) Int. Cl.
*G06F 17/00* (2006.01)
(52) U.S. Cl. .................. 707/609; 707/636; 707/637
(58) Field of Classification Search .............. 707/2, 707/6–7, 104.1
See application file for complete search history.

(56) References Cited

U.S. PATENT DOCUMENTS

| 5,745,900 | A | * | 4/1998 | Burrows ................ 707/102 |
| 5,909,677 | A | | 6/1999 | Broder |
| 5,982,956 | A | * | 11/1999 | Lahmi ................... 382/306 |
| 6,886,129 | B1 | * | 4/2005 | Raghavan et al. .......... 715/205 |
| 6,968,331 | B2 | | 11/2005 | Bar-Yossef |
| 7,627,613 | B1 | * | 12/2009 | Dulitz et al. ............. 707/203 |
| 2002/0049753 | A1 | * | 4/2002 | Burrows ................... 707/3 |
| 2003/0106017 | A1 | * | 6/2003 | Kanchirayappa et al. .... 715/511 |
| 2004/0243569 | A1 | * | 12/2004 | Burrows ................... 707/3 |
| 2006/0041597 | A1 | * | 2/2006 | Conrad et al. ............ 707/200 |
| 2007/0005589 | A1 | * | 1/2007 | Gollapudi ................. 707/5 |
| 2008/0044016 | A1 | * | 2/2008 | Henzinger ............... 380/201 |
| 2008/0162478 | A1 | * | 7/2008 | Pugh et al. ................ 707/6 |
| 2008/0306943 | A1 | * | 12/2008 | Patterson ................. 707/6 |
| 2008/0319971 | A1 | * | 12/2008 | Patterson ................. 707/5 |

OTHER PUBLICATIONS

David Gibson et al., *The Volume and Evolution of Web Page Templates*, ACM Press, 14th International Conference on World Wide Web, May 10, 1995 (10 pgs).

* cited by examiner

*Primary Examiner*—Hung T Vy
*Assistant Examiner*—Hanh B Thai
(74) *Attorney, Agent, or Firm*—Hickman Palermo Truong & Becker LLP

(57) ABSTRACT

Techniques are disclosed for detecting web pages with duplicate content. In one embodiment, a set of shingles is computed for each page of a group of pages. An aggregate set of shingles is determined based on the sets of shingles computed for the group of pages. A first subset from the aggregate set of shingles is determined by selecting, from the aggregate set, shingles whose frequencies in the aggregate set exceed a specified threshold. A modified set of shingles is generated for each page of the group of pages by removing, from the set of shingles for that page, any shingle included in the first subset. One or more duplicate pages in the group of pages are determined based at least in part on the modified sets of shingles generated for the group of pages.

20 Claims, 4 Drawing Sheets

TECHNIQUES FOR DETECTING DUPLICATE WEB PAGES

FIELD OF THE INVENTION

The present invention relates to search engines and, more specifically, to techniques for detecting duplicate web pages.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As used herein, a "page" (or "web page") refers to an online document. An online document may be any set of data including, but not limited to, an image, a Portable Document Format (PDF) document, a set of binary data, and a markup language document. Examples of markup languages include, but are not limited to, HyperText Markup Language (HTML), eXtensible Markup Language (XML), as well as a wide variety of markup languages that are derivatives of the Standard Generalized Markup Language (SGML).

According to current estimates, a significant percentage of the pages on the worldwide web include duplicate content. Correctly identifying pages with duplicate content is important for content search engines because, among other benefits, it can reduce the storage space required for storing content indexes and can improve the quality of search results returned to users.

In one approach, a content search engine uses a shingle-based mechanism for detecting duplicate web pages. As used herein, "shingle" refers to a compact data value that represents a fragment of a page. In this approach, the search engine computes a fingerprint of a given page by computing a collection of shingles, where each shingle in the collection is computed based on a particular fragment that is defined by a sliding window over the content of the given page. The search engine determines that two pages have duplicate content when the two pages have the same or substantially the same fingerprints.

The disadvantage of this duplicate detection mechanism is that in the presence of site-level page templates it produces false positives (e.g. classifying pages as having duplicate content when in fact the pages have different content) and false negatives (e.g. classifying pages as non-duplicates when in fact the pages have the same content). One of the reasons for this disadvantage is that the shingles used to detect the pages with duplicate content may have been computed over page fragments that originate from the same template part of a site-level template that is shared by the pages on a given site.

For example, two different web pages on the same site or host usually share the same site-level template, where the site-level template may be a set of HTML or other markup code that is common to, and determines the layout of, all pages on the particular site or host. When the shingles, which are used by a duplicate detection mechanism to determine whether two pages have duplicate content, originate from the same page portions defined by a site-level template, then the duplicate-detection mechanism would classify the two pages as having duplicate content even though the two pages may in fact have different content. Similarly, when the site-level templates for two different sites are different, the duplicate detection mechanism would classify two pages at the different sites as non-duplicates even though the two pages may in fact have the same content.

To illustrate, consider FIG. 1 which is a block diagram that illustrates an example layout of a web page. (Different sites or hosts may store web pages that have layouts that are different from the page layout illustrated in FIG. 1; for example, different layouts may include a wide variety of different portions in different page positions. It is noted that the techniques described herein are not limited to detecting duplicate pages having any particular layout defined by any particular site-level template, and for this reason the page layout depicted in FIG. 1 is to be regarded in an illustrative rather than a restrictive sense.) In FIG. 1, a site-level template may be used to define the common portions of a typical page 100 stored on the site. The common page portions may comprise one or more advertisement portions 102A-B, a navigation portion 104, and a contact/copyright portion 106. Each of the one more advertisement portions 102A-B may be used on each page of the site to display certain ads. The navigation portion 104 is also common for each page on the site and is used to display buttons and links which a user may use to navigate through the site. The contact/copyright portion 106 is also common for each page on the site and is used to display the same copyright and/or contact information. Content portion 108 is used to display the content of each page on the site; hence, the content portion 108 would likely be different for the different pages on the site.

Suppose now that a shingle-based duplicate detection mechanism computes fingerprints for two pages on the site, where the shingles in each fingerprint are computed over fragments from the advertisement portions 102A-B, the navigation portion 104, and the content/copyright portion 106 (which are common for both pages). The duplicate detection mechanism would compare the fingerprints for each page, would find the shingles therein to be the same, and would classify the two pages as having duplicate content even though the content portions 108 of the two pages may be different.

Based on the foregoing, there is a clear need for techniques that improve the accuracy of duplicate page detection and that overcome the disadvantages of the shingle-based duplicate detection mechanism described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Functional Overview

Techniques are disclosed for improving detection of duplicate web pages. As used herein, a "duplicate page" (or simply a "duplicate") refers to a page that includes the same or substantially the same content portion as another one or more pages. Duplicate pages may be present on the same site or on different sites. As used herein, "site" generally refers to a group of pages that are related according to some criteria or in some way, such as, for example, based on a shared page layout, based on a shared design site-level templates, based on common ownership, etc. For example, "site" can refer to all pages under a particular domain, sub-domain, host, sub-host, and/or any URL-path expression such as "www.nytimes.com/sports/tennis/*". ("yahoo.com" and "news.yahoo.com" are examples of a domain and sub-domain; "in.news.yahoo.com" and "www.nytimes.com/sports" are examples of a host and a sub-host.) As another example, "site" can refer to a group of pages that are "owned" by the same entity. As another example, the pages on multiple domains and/or multiple hosts owned by the same entity may also be considered a "site". As another example, "site" can refer to the pages on a mirror host (e.g., "www.cnn.com" may be a mirror host of "www2.cnn.com").

As an example of duplicate pages, consider a particular news site that includes a news article as an HTML page, a print page (which is a page specifically formatted for user-friendly printing, e.g., without any advertisements or navigation panes) of the same article, and/or a RSS feed page (which is a page formatted specifically for electronic downloading of content) for the article. When a user searches the particular news site, there is no particular reason or benefit to show links to all three pages in the returned search results since the user is not likely to be interested in seeing three different links to the same news article.

Figure 1:
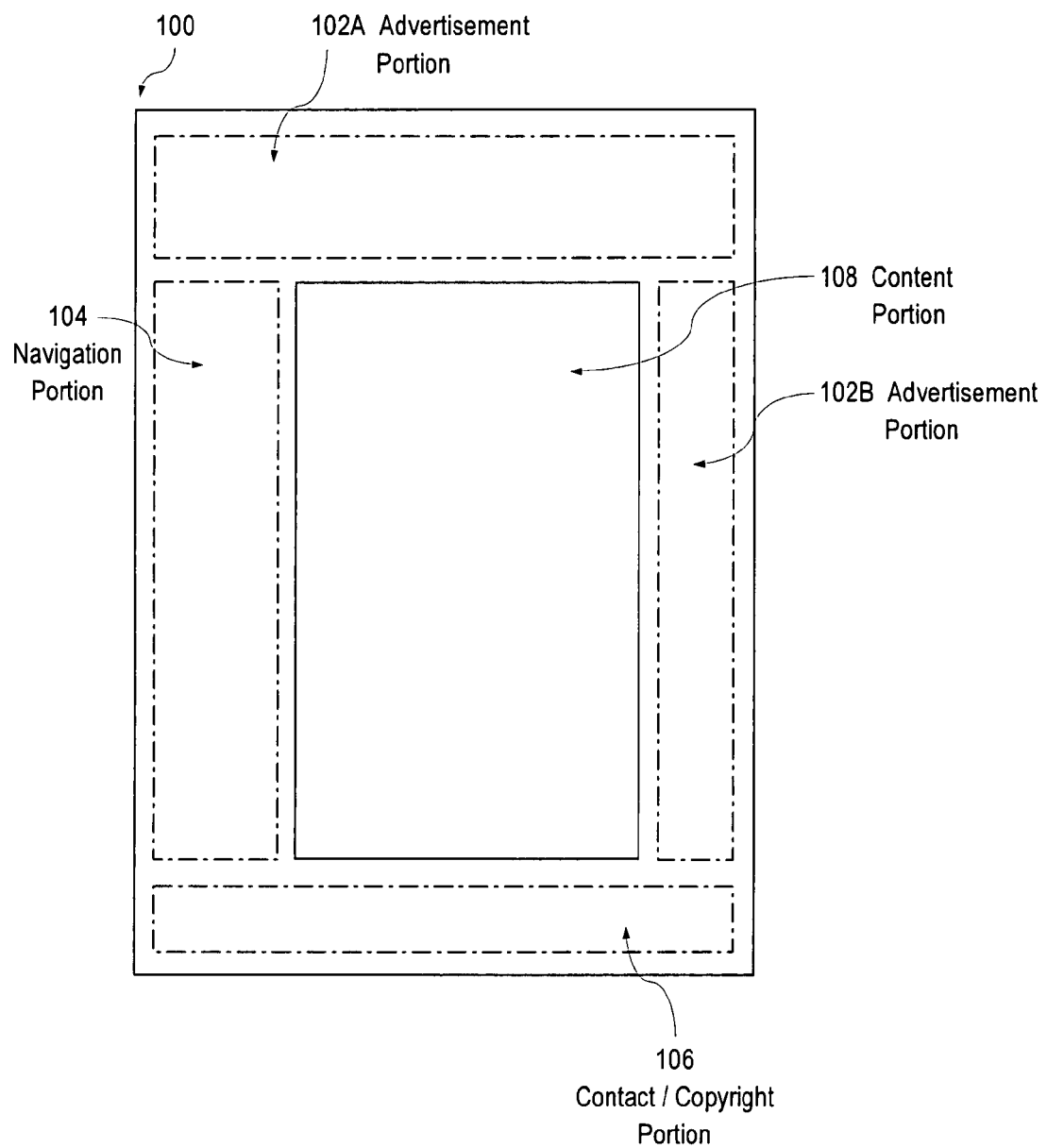
FIG. 1 is a block diagram that illustrates an example layout of a web page.
Figure 2:
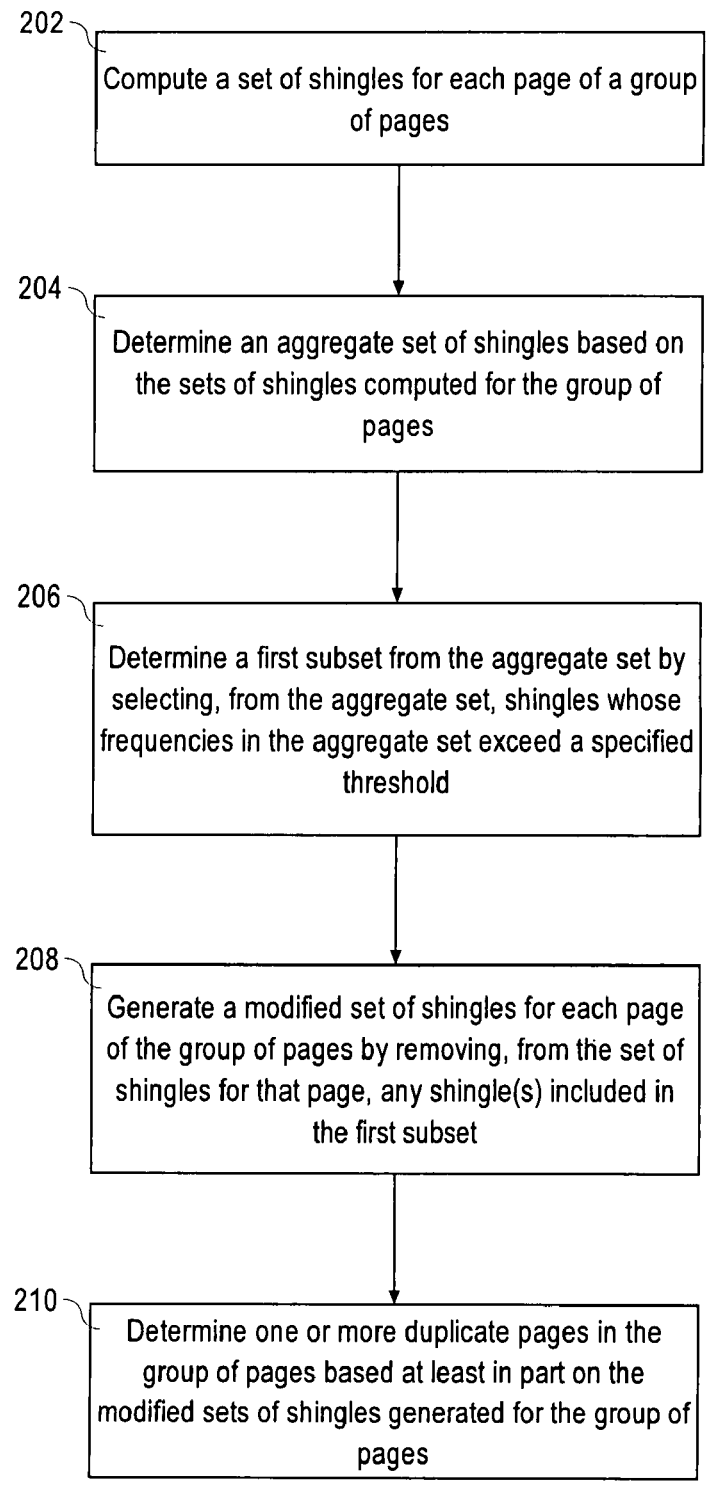
FIG. 2 is a flow diagram that illustrates an example of an improved method for detecting duplicate web pages according to some embodiments.

FIG. 2 is a flow diagram that illustrates an example of an improved method for detecting duplicate web pages according to the techniques described herein.

In step 202, a set of shingles is computed for each page of a group of pages. As used herein, "shingle" refers to a compact data value that represents a fragment of a page. A shingle may be of any data type including, but not limited to, a numeric data type, a string datatype, and any binary data type. In some embodiments, each shingle in the set of shingles for a particular page may be computed over a randomly selected fragment of the page. In other embodiments, the set of shingles for a particular page may be selected from a plurality of all shingles that can be computed for the page.

In step 204, an aggregate set of shingles is determined based on the sets of shingles computed for the pages in the group of pages. For example, in some embodiments the aggregate set may include all shingles from all sets of shingles computed for the pages of the group of pages. In another example, in some embodiments the aggregate set may include a subset of the shingles included in sets of shingles computed for the pages of the group of pages.

In step 206, a subset of frequently occurring shingles in the aggregate set is determined. The subset may be determined by selecting from the aggregate set those shingles whose frequency of occurrence in the set exceeds a specified threshold. For example, in some embodiments the frequency of occurrence of a particular shingle in the aggregate set may be a ratio between the number of pages in which that shingle occurs and the total number of pages in the group of pages. In these embodiments, the specified threshold may be a percentage of the number of pages in the group of pages. In another example, in some embodiments the frequency of occurrence of a particular shingle in the aggregate set may be a counter indicating the number of pages in which that shingle occurs. In these embodiments, the specified threshold may be a specific number of pages.

In step 208, a modified set of shingles is generated for each page in the group of pages. The modified set for each particular page may be generated by removing, from the computed set of shingles for that page, any shingle or shingles that are included in the subset of frequently occurring shingles.

In step 210, one or more duplicate pages are determined in the group of pages based at least in part on the modified sets of shingles that are generated for the pages in the group of pages. For example, in some embodiments, a shingle-based duplicate detection logic may be executed and applied to the modified sets of shingles in order to determine whether each page in the group of pages is a duplicate of any other page in the group.

In this manner, the techniques described herein provide for improving the detection of duplicate pages. Improving the detection of duplicate pages in turn provides other benefits including, but not limited to, more efficient crawling of pages by ceasing to crawl and follow links out of duplicate pages, more efficient storage of content indexes by not storing index entries for duplicate pages, and more accurate responses to user queries by not including duplicate pages in search results.

Further, in contrast to other mechanisms that determine duplicate pages based on computationally expensive pattern recognition algorithms and/or HTML-node comparison algorithms, the techniques described herein provide a computationally efficient way of improving the accuracy of shingle-based duplicate detection mechanisms. By finding and removing from consideration any shingles that may have been computed over fragments from shared common portions of related pages, in a computationally efficient way the techniques described herein increase the likelihood that the remaining shingles relied on by a duplicate detection mechanism are unique enough to cause a more accurate duplicate detection.

Computing Shingles for Related Pages

According to the techniques described herein, as a crawler is traversing the web, the crawler identifies a group of pages that are related or associated with each other according to some criteria. After the crawler accesses and retrieves the group of pages, a set of shingles is computed for each page in the group of related pages. The set of shingles computed for each page may be stored in computer data storage. As used herein, "computer data storage" refers to one or more data structures, which are operable to store data and which may be accessed by a computing device such as a computer system. A computer data storage may be physically stored in any volatile and/or non-volatile computer-readable medium. For example, a computer data storage may be implemented in a storage device that includes volatile media, such as RAM or other dynamic memory, or non-volatile media, such as an electromagnetic or optical disk.

One example embodiment may use shingles that are hash values computed over fragments of a page. In this embodiment, the markup language code of each page in the group of pages is first unfolded. For each page of the group of pages, hash values are computed based on a sliding window that may include a certain number of words, for example, 10 words. The window slides one word at a time starting at the beginning of the unfolded page, and at each word a shingle is computed by evaluating a hash function over the words currently included in the window. In this manner, as many shingles are computed for each page as there are text words in that page.

In some example embodiments, after computing the shingles for a particular page, a set of shingles is selected from all computed shingles. The selection of the shingles may be random or may be based on particular criteria. For example, the selected set may include a certain number of shingles that have the smallest values among all shingles computed for the particular page. The size of a set of shingles may also be fixed; for example, the same number of shingles may be selected into the set of shingles for each page in the group. In other embodiments, all shingles computed for a particular page may be included in the set of selected shingles for that page.

In some example embodiments, the set of shingles for a particular page may be computed based on the text of the entire page, including tags and other markup that may be present in the page. In other embodiments, the tags and other markup may be stripped from the page prior to computing the set of shingles for that page. In some implementations this may improve the accuracy of any duplicate detection mechanism because the common text of tags and other markup is excluded when the shingles for each particular page are computed.

Different embodiments may use as shingles various types of values that are capable of representing fragments of a page. For example, in some embodiments, a shingle may be a Cyclical Redundancy Check (CRC) value that is computed over a sliding window of text from a particular page. As another example, in some embodiments, page fragments may be directly used as the shingles for that page. As another example, in some embodiments, shingles may be computed based on information included in a Document Object Model (DOM) tree that is generated for the HTML code of a page. Thus, the techniques described herein are not limited to any particular type of shingle or any particular mechanism for computing shingles. For this reason, the examples of shingles and mechanisms for computing shingles described herein are to be regarded in an illustrative rather than a restrictive sense.

Aggregating Shingles Computed for Related Pages

According to the techniques described herein, after a separate set of shingles is computed for each page of a group of related pages, an aggregate set of shingles is generated and stored in computer data storage. For example, in one embodiment, the aggregate set of shingles may be generated and stored as a table that includes one row for each page in the group of pages, where the columns of a particular row would store the shingles in the set of shingles computed for the particular page associated with that row. In this embodiment, the table storing the aggregate set may be implemented in volatile memory and/or on persistent storage.

According to the techniques described herein, the aggregate set of shingles is based on the sets of shingles computed for the pages in the group of related pages. In the aggregate set, each shingle may be associated with the particular page from which that shingle was generated. In various embodiments, the associations in the aggregate set between shingles and their corresponding pages may be kept in a variety of logical data structures including, but not limited to, tables, arrays, and linked lists. The techniques described herein are not limited to any particular structure for storing the aggregate set of shingles and the associations to pages thereof. Thus, the examples of storage structures operable to store an aggregate set of shingles provided herein are to be regarded in an illustrative rather than a restrictive sense.

Determining Frequently-Occurring Shingles in an Aggregate Set

According to the techniques described herein, a subset of frequently occurring shingles in the aggregate set is determined. (The subset of frequently occurring shingles is also referred to hereinafter as a "subset of frequent shingles".) The subset of frequent shingles may be determined by selecting, from the aggregate set, only those shingles whose frequency of occurrence in the set exceeds a specified threshold.

Using a Percentage Threshold

In some embodiments, the specified threshold may be defined as a percentage of the number of pages in the group of pages. This threshold percentage may be a configurable parameter that is specified for all groups of pages being processed, or it may be a dynamic parameter that is set based on some particular characteristics of the group of pages, such as, for example, the number and/or size of the pages in the group of pages.

In these embodiments, the frequency of occurrence of a particular shingle in the aggregate set may be defined as the ratio between the number of pages in which that shingle occurs and the total number of pages in the group of pages. The frequency ratio for a particular shingle may be determined as follows. First, shingles in the aggregate set are traversed and a counter is incremented for each page in which the particular shingle is found to be present. Next, the counter for the particular shingle is divided over the number of pages in the group of pages. After the frequency ratio for a particular shingle is determined, the frequency ratio is compared to the specified threshold. If the frequency ratio is greater than the specified threshold, then the particular shingle is included in the subset of frequent shingles; otherwise, the particular shingle is not included in the subset of frequent shingles.

Using a Number Threshold

In some embodiments, the specified threshold may be defined as a specific number of pages. This threshold may be a dynamic or a static parameter that is configurable for all processed groups of pages or on a per-group basis.

In these embodiments, the frequency of occurrence of a particular shingle in the aggregate set may be defined as a counter indicating the number of pages in which that shingle occurs. The frequency counter for a particular shingle may be determined by traversing the shingles in the aggregate set and counting the pages in which the particular shingle is found to be present. The frequency counter is then compared to the specified threshold. If the frequency counter is greater than the specified threshold, then the particular shingle is included in the subset of frequent shingles; otherwise, the particular shingle is not included in the subset of frequent shingles.

Various embodiments may use various types of thresholds and various mechanisms and algorithms to determine the shingles that are frequently occurring in the aggregate set. The techniques described herein are not limited to any particular type of threshold or mechanism for determining a subset of frequent shingles from an aggregate set. Thus, the examples of thresholds and mechanisms for determining a subset of frequent shingles provided herein are to be regarded in an illustrative rather than a restrictive sense.

Filtering Out the Frequently-Occurring Shingles

After determining the subset of frequent shingles, according to the techniques described herein, a modified set of shingles is generated for each page in the group of related pages. The modified sets of shingles generated for the pages in the group of pages may be stored in computer data storage. The modified set for a particular page does not include any shingle that is determined to be frequently occurring in the aggregate set generated for the group of pages.

For example, in one embodiment, the modified set for a particular page may be generated as follows. Each shingle in the set of shingles computed for the particular page is compared to all shingles included in the subset of frequent shingles. If the shingle being compared matches any shingle in the subset of frequent shingles, then the shingle being compared is removed from the set of shingles computed for the particular page. After all shingles in the set of shingles for the particular page are processed in this manner, the shingles remaining in the set comprise the modified set of shingles for that particular page.

In this way, any shingle determined to be frequently present in the aggregate set for the group of pages is filtered out from the sets of shingles computed for each individual page of the group of pages. This allows the techniques described herein to provide a computationally efficient way to remove from consideration for duplicate detection any shingle that is likely to have been computed over fragments from common portions of the pages in the group of pages. Notably, the techniques described herein achieve this without actually identifying the common portions in the pages of the group of pages.

Determining Duplicate Pages

After determining the modified set of shingles for each page in the group of related pages, according to the techniques described herein the modified sets of shingles are fed into a shingle-based duplicate detection mechanism to determine the one or more duplicate pages (if any) that are present in the group of pages.

In general, for two documents A and B, a duplicate detection mechanism tries to measure a metric that is the ratio of A intersect B to A union B. A shingle-based duplicate detection mechanism approximates this metric by computing shingles for documents A and B and counting the number of common shingles.

One example of a shingle-based duplicate detection mechanism that may be used in conjunction with the techniques described herein is provided in Broder et al., U.S. Pat. No. 5,909,677 (the '677 patent), issued on Jun. 1, 1999 and entitled "METHOD FOR DETERMINING THE RESEMBLANCE OF DOCUMENTS," the entire contents of which are hereby incorporated by reference for all purposes as if fully set forth herein. Notably, however, the techniques described herein may be used in conjunction with any duplicate detection mechanism that is operable to detect duplicate pages based on shingles computed from the pages. Thus, the techniques described herein are not limited to being used with any particular duplicate detection mechanism, and the duplicate detection mechanism described in the '677 patent is to be regarded in an illustrative rather than a restrictive sense.

According to the techniques described herein, in some embodiments duplicate detection logic may be applied to the modified sets of shingles generated for the pages in the group of pages. Based on the modified sets, the duplicate detection logic when executed may classify or rank each page in the group of pages in at least three categories: a unique category, a parent category, and a duplicate category. Pages ranked in the unique category are considered to have unique content portions. Pages ranked in the parent category are considered to be representative pages for one or more pages in the duplicate category with the same or substantially the same content. Pages ranked in the duplicate category are considered to have the same or substantially the same content as one page in the parent category. Every page in the duplicate category has a corresponding representative page in the parent category. Pages may be classified as parents or duplicates based on their relative importance; for example, pages with more incoming links may be preferred as parents instead of as duplicates.

In these embodiments, the ranking or categorization generated based on the modified sets of shingles for the pages in the group of pages may be used in a content search system in various ways. For example, based on the ranking, a crawler in the search system may stop following links out of duplicate pages. In another example, based on the ranking, an index engine in the search system would not index duplicate pages and would not store any entries for the duplicate pages in a searchable database. As a result, a search engine in the system would not display indications or links to the duplicate pages in search results that are generated in response to queries issued by a user.

It is noted that the techniques described herein provide for generating a more accurate page ranking or categorization in a computationally efficient way. Thus, the page ranking or categorization generated according to the techniques described herein may provide a computational improvement for any system component that is operable to process pages based on the ranking or categorization. For this reason, the usage of the page ranking and categorization described herein is to be regarded in an illustrative rather than a restrictive sense.

Example Operational Context

Figure 3:
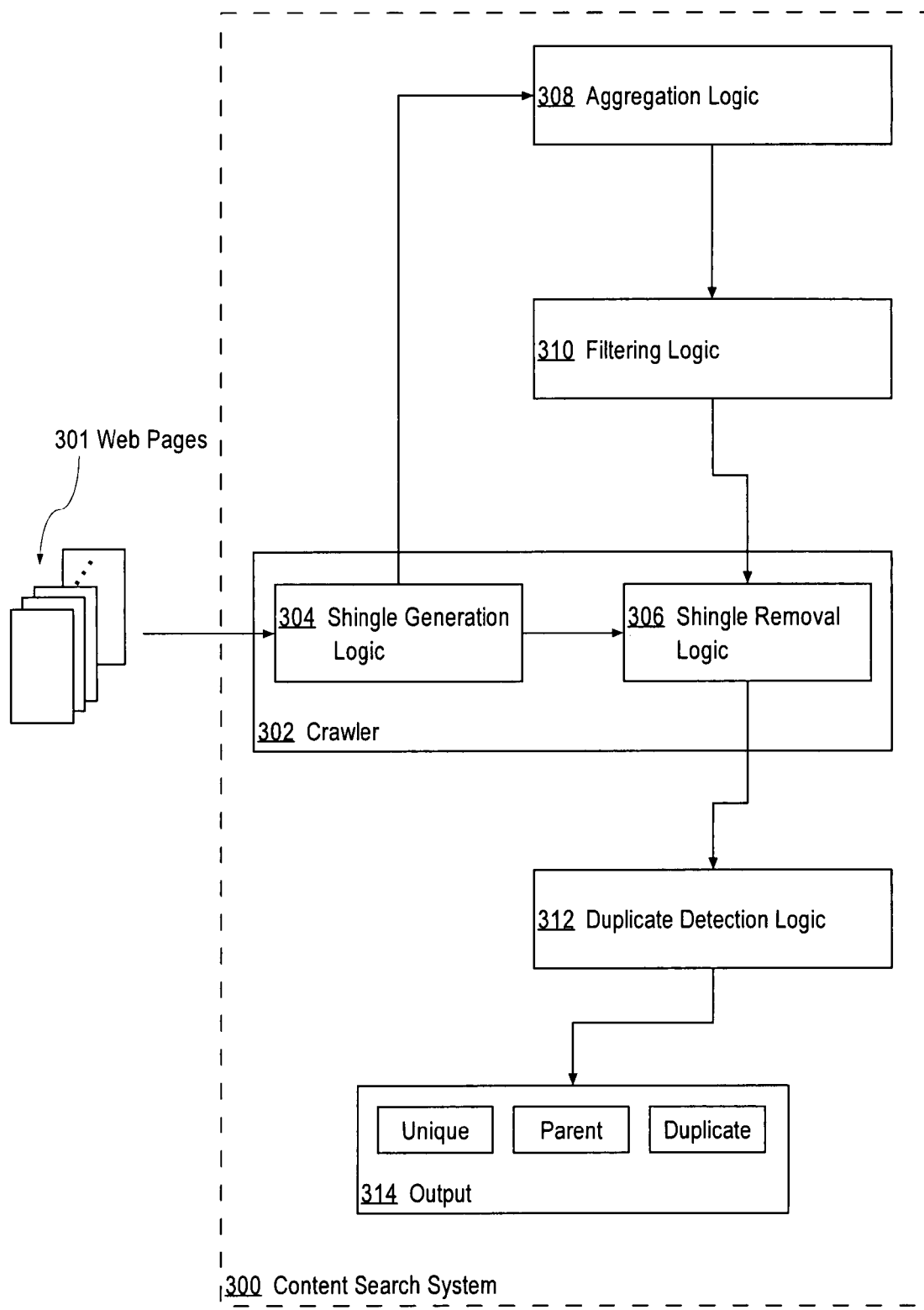
FIG. 3 is a block diagram that illustrates an example content search system according to one embodiment.

FIG. 3 is a block diagram that illustrates an example content search system according to one embodiment.

Content search system 300 is generally operable to facilitate searching of web content. According to the techniques described herein, content search system 300 comprises crawler 302, aggregation logic 308, filtering logic 310, and duplicate detection logic 312. Content search system 300 may further comprise one or more components which are not shown in FIG. 3 and which may include, without limitation, an index engine operable to index content retrieved from the web and to store content indexes in a searchable database, a search engine operable to search the database in response to user queries, and one or more other components such as web servers operable to provide interfaces for receiving user input and for displaying the search results to the users.

Crawler 302 may be a process comprising a combination of integrated software components and an allocation of computational resources, such as memory, CPU time, and/or disk storage space. By utilizing its allocated computational resources, crawler 302 is operable to automatically browse the web and to access and retrieve any pages therefrom.

According to the techniques described herein, crawler 302 comprises shingle generation logic 304 and shingle removal logic 306. Shingle generation logic 304 may comprise one or more integrated software components, which when executed by one or more processors, are operable to compute shingles for pages retrieved by crawler 302. Shingle removal logic 306 may comprise one or more integrated software components, which when executed by one or more processors, are operable to remove frequently occurring shingles from the sets of shingles generated by shingle generation logic 304 for the pages retrieved by crawler 302.

Aggregation logic 308 may comprise one or more integrated software components which, when executed by one or more processors, are operable to generate an aggregate set of shingles according to the techniques described herein. In some embodiments, aggregation logic 308 may be implemented as a library of functions, which may be invoked via calls made by components of search system 300. In some embodiments, aggregation logic 308 may be implemented as a process or thread, which is allocated computational resources such as CPU time and memory and which is operable to respond to requests from other components of search system 300.

Filtering logic 310 may comprise one or more integrated software components which, when executed by one or more processors, are operable to generate a subset of frequent shingles according to the techniques described herein. In some embodiments, filtering logic 310 may be implemented as a library of functions, which may be invoked via calls made by components of search system 300. In some embodiments, filtering logic 310 may be implemented as a process or thread, which is allocated computational resources such as CPU time and memory and which is operable to respond to requests from other components of search system 300.

Duplicate detection logic 312 may comprise one or more integrated software components which, when executed by one or more processors, are operable to detect duplicate pages based on a shingle-based duplicate detection mechanism that is operable in conjunction with the techniques described herein. In some embodiments, duplicate detection logic 312 may be implemented as a library of functions, which may be invoked via calls made by components of search system 300. In some embodiments, duplicate detection logic 312 may be implemented as a process or thread, which is allocated computational resources such as CPU time and memory and which is operable to respond to requests from other components of search system 300.

As an operational example, suppose that crawler 302 browses the web and determines that group 301 includes one hundred pages that are related in some way, for example, by being provided on the same host computer system.

After crawler 302 or a component thereof retrieves the pages in group 301, according to the techniques described herein shingle generation logic 304 computes and stores in computer data storage a set of shingles for each page in group 301. For example, for each particular page, shingle generation logic 304 first strips that page of any tags (e.g. HTML tags) or other markup. Then, shingle generation logic 304 computes as many shingles as there are words in that particular page by evaluating a hash function over a window of 10 words that slides over the stripped page one word at a time. From all shingles computed for that page, shingle generation logic 304 selects the 24 shingles that have the smallest values. In this manner, shingle generation logic 304 generates a set of 24 shingles for each of the one hundred pages in group 301. Thereafter, shingle generation logic 304 invokes aggregation logic 308.

According to the techniques described herein, aggregation logic 308 generates and stores in computer data storage an aggregated set that includes the generated 2400 shingles (24 shingles per each of the one hundred pages in group 301). For example, aggregation logic 308 may generate a table with 100 rows, where each row is associated with one of the pages in group 301, and where the columns of any particular row store the 24 shingles computed for the particular page associated with that row. Thereafter, aggregation logic 308 invokes filtering logic 310.

Filtering logic 310 generates and stores in computer data storage the 16 shingles that occur most frequently in the aggregate set. For example, according to the techniques described herein, filtering logic 310 may determine for each particular shingle in the aggregated set a frequency with which that particular shingle occurs in the aggregate set. Filtering logic 310 then compares the frequency of each particular shingle to a specified threshold, and based on the result of the comparison determines whether to include the that particular shingle in the 16 most frequently occurring shingles. After filtering logic 310 processes all shingles in the aggregate set and determines the 16 most frequent shingles, filtering logic 310 invokes shingle removal logic 306 in crawler 302.

According to the techniques described herein, shingle removal logic 306 traverses the sets of 24 shingles computed for the pages in group 301, and removes from each set any shingle in the 16 most frequent shingles. For example, for each particular set of 24 shingles that is associated with a particular page of group 301, shingle removal logic 306 compares each shingle in that particular set to each shingle in the 16 most frequent shingles, and removes from that particular set any matching shingle. After shingle removal logic 306 completes the removal of the frequent shingles in this manner, each set of 24 shingles for each page in group 301 would include at least 8 shingles that comprise the modified set of shingles for that page. (In some embodiments, crawler 302 or a component thereof may further process any modified set that includes more than 8 shingles to adjust that set to include exactly 8 shingles.)

Thereafter, duplicate detection logic 312 is invoked to determine the duplicate pages (if any) in group 301 based on the modified sets of at least 8 shingles generated for the pages in the group. When invoked, duplicate detection logic 312 generates and stores output 314 in computer data storage. Output 314 is a set of data that comprises a classification of the pages in group 301 into unique, parent, and duplicate categories. Since according to the techniques described herein any common and/or frequently occurring shingles have been found and removed from the modified sets, the shingles remaining in the modified sets are likely to be unique enough in order to cause duplicate detection logic 312 to determine any duplicate pages more accurately.

While in FIG. 3 the functionalities provided by the techniques described herein are explained as being performed by particular components of content search system 300, it is noted that the techniques described herein are not limited to systems that include the particular components illustrated in FIG. 3. For example, in some embodiments, the functionalities of crawler 302, shingle generation logic 304, aggregation logic 308, filtering logic 310, shingle removal logic 306, and duplicate detection logic 312 may be performed by one integrated component or by any combination of two or more components. Thus, the components of content search system 300 illustrated in FIG. 3 are to be regarded in an illustrative rather than a restrictive sense.

Additional Features and Alternative Embodiments

In some embodiments, modified sets of shingles generated according to the techniques described herein may be used by a search engine to rank search results that are returned in response to a user query.

For example, after the most frequent shingles are removed from the sets of shingles of a group of pages to generate the modified sets, a search engine may generate a ranking for each page in the group based on the modified set of shingles for the pages in that group. The ranking for each page may be stored in a searchable database in association with that page. Thereafter, in response to a user query, a search engine may sort and display an indication of that page in search results in accordance with the ranking associated with that page.

Hardware Overview

Figure 4:
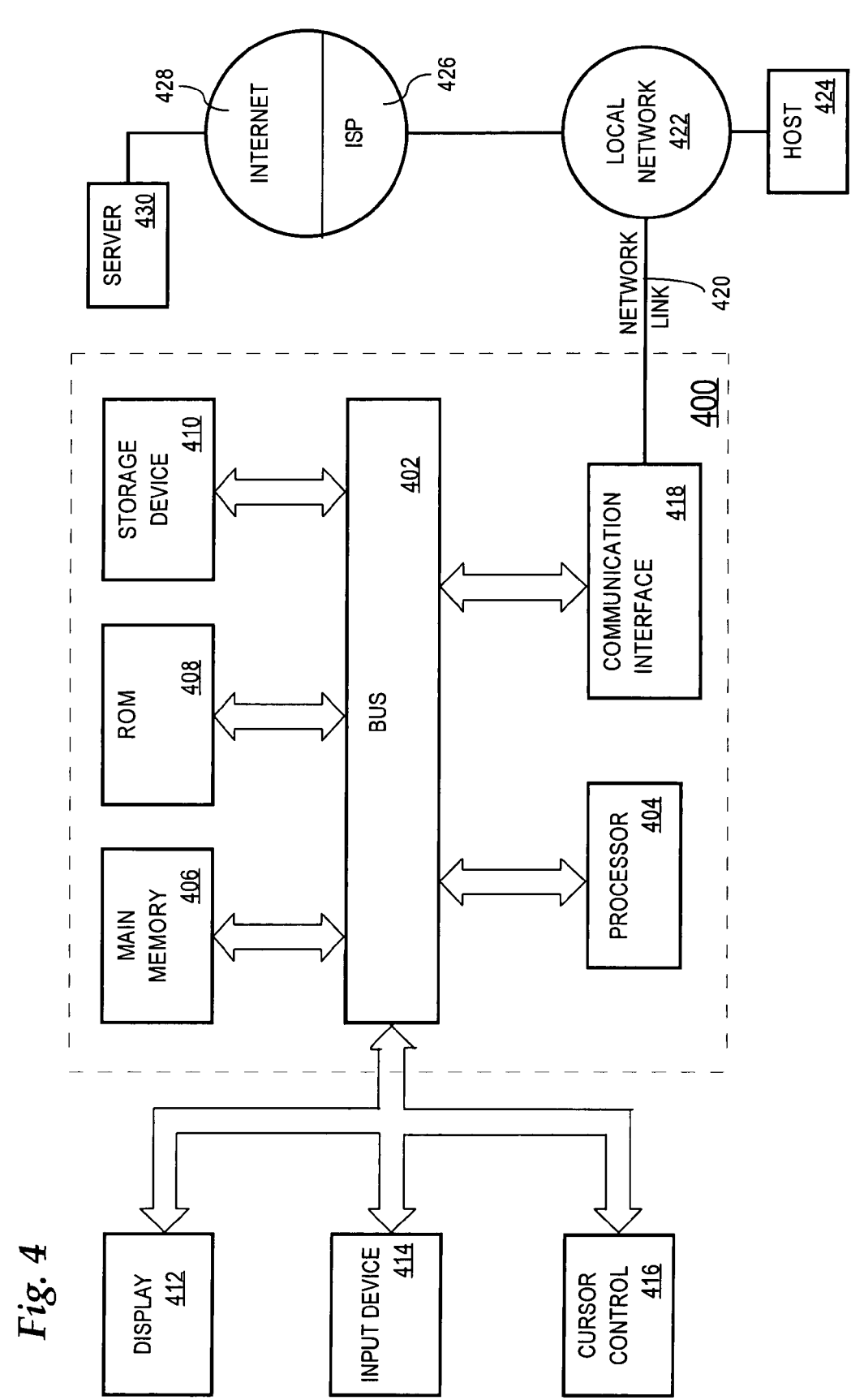
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer or another device to operate in a specific fashion. In an embodiment implemented using computer system 400, various computer-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   computing a set of shingles for each page of a group of pages;
   determining an aggregate set of shingles based on the sets of shingles computed for the group of pages;
   determining a first subset from the aggregate set of shingles by selecting, from the aggregate set, shingles whose frequencies of occurrences in the aggregate set exceed a specified threshold;
   for each page of the group of pages, generating a modified set of shingles for said each page by removing, from the set of shingles for said each page, any shingle included in the first subset;
   determining one or more duplicate pages in the group of pages based at least in part on the modified sets of shingles generated for the group of pages; and
   storing a set of data that indicates the one or more duplicate pages;
   wherein the method is performed by one or more computer systems.

2. The method of claim 1, wherein computing the set of shingles for said each page comprises:
   computing a plurality of shingles for said each page, wherein each shingle in the plurality of shingles is a hash value calculated by evaluating a hash function over a text fragment of said each page; and
   determining the set of shingles for said each page by selecting a specified number of shingles from the plurality of shingles.

3. The method of claim 2, wherein selecting the specified number of shingles from the plurality of shingles for said each page comprises any one of:
   selecting the specified number of shingles randomly from the plurality of shingles for said each page; and
   selecting the specified number of shingles that have the smallest values among the plurality of shingles for said each page.

4. The method of claim 1, wherein determining the aggregate set of shingles comprises including in the aggregate set all shingles from all sets of shingles computed for the group of pages.

5. The method of claim 1, wherein determining the first subset from the aggregate set of shingles comprises:
   for each shingle in the aggregate set of shingles:
      computing a frequency of occurrence as a ratio between the number of pages, of the group of pages, in which said each shingle is present and the total number of pages in the group of pages; and
      comparing the frequency of occurrence to the specified threshold to determine whether to include said each shingle in the first subset;
   wherein the specified threshold is a specified percentage of the number of pages included in the group of pages.

6. The method of claim 1, wherein determining the first subset from the aggregate set of shingles comprises:
   for each shingle in the aggregate set of shingles:
      computing a frequency of occurrence as a counter indicating the number of pages, of the group of pages, in which said shingle is present; and
      comparing the frequency of occurrence to the specified threshold to determine whether to include said each shingle in the first subset;
   wherein the specified threshold is a specified number of pages.

7. The method of claim 1, further comprising:
   prior to computing the set of shingles for said each page of the group of pages:
      crawling said each page; and
      retrieving the content of said each page; and
   after determining the one or more duplicate pages in the group of pages, performing at least one of:
      ceasing to crawl the one or more duplicate pages; and
      ceasing to crawl links out of the one or more duplicate pages.

8. The method of claim 1, wherein determining the one or more duplicate pages in the group of pages further comprises categorizing said each page in the group of pages as any one of:
   a unique page, which includes unique content in the group of pages;
   a duplicate page, which includes substantially the same content as one or more other pages of the group of pages; and
   a parent page, which is a representative page for one or more other pages of the group of pages that have substantially the same content.

9. The method of claim 1, further comprising excluding index entries for the one or more duplicate pages from a content index generated over the group of pages.

10. A computer-implemented method comprising:
    computing a set of shingles for each page of a group of pages that are related according to one or more criteria;
    determining an aggregate set of shingles based on the sets of shingles computed for the group of pages;
    determining a first subset from the aggregate set of shingles by selecting, from the aggregate set, shingles whose frequencies of occurrences in the aggregate set exceed a specified threshold;
    generating a modified set of shingles for said each page of the group of pages by removing, from the set of shingles for said each page, any shingle included in the first subset;
    generating a ranking for said each page of the group of pages based at least in part on the modified set of shingles for said each page; and
    displaying, in search results, an indication of said each page of the group of pages according to the ranking for said each page;
    wherein the method is performed by one or more computer systems.

11. A computer-readable volatile or non-volatile medium storing one or more sequences of instructions which, when executed by one or more processors, cause the one or more processors to perform the method recited in claim 1.

12. A computer-readable volatile or non-volatile medium storing one or more sequences of instructions which, when executed by one or more processors, cause the one or more processors to perform the method recited in claim 2.

13. A computer-readable volatile or non-volatile medium storing one or more sequences of instructions which, when executed by one or more processors, cause the one or more processors to perform the method recited in claim 3.

14. A computer-readable volatile or non-volatile medium storing one or more sequences of instructions which, when executed by one or more processors, cause the one or more processors to perform the method recited in claim 4.

15. A computer-readable volatile or non-volatile medium storing one or more sequences of instructions which, when executed by one or more processors, cause the one or more processors to perform the method recited in claim 5.

16. A computer-readable volatile or non-volatile medium storing one or more sequences of instructions which, when executed by one or more processors, cause the one or more processors to perform the method recited in claim 6.

17. A computer-readable volatile or non-volatile medium storing one or more sequences of instructions which, when executed by one or more processors, cause the one or more processors to perform the method recited in claim 7.

18. A computer-readable volatile or non-volatile medium storing one or more sequences of instructions which, when executed by one or more processors, cause the one or more processors to perform the method recited in claim 8.

19. A computer-readable volatile or non-volatile medium storing one or more sequence of instructions which, when executed by one or more processors, cause the one or more processors to perform the method recited in claim 9.

20. A computer-readable volatile or non-volatile medium storing one or more sequences of instructions which, when executed by one or more processors, cause the one or more processors to perform the method recited in claim 10.

\* \* \* \* \*